Patented Sept. 29, 1925.

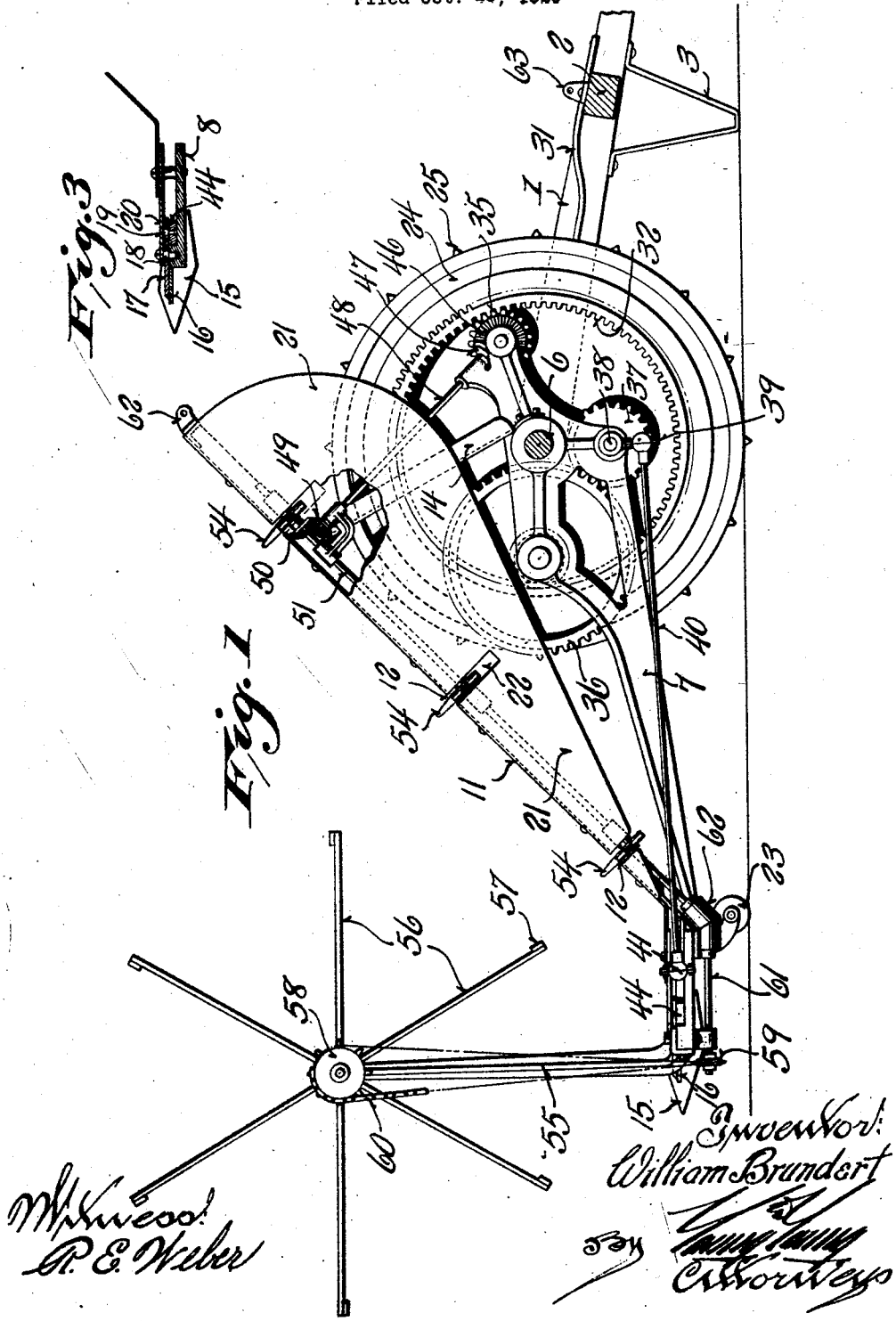

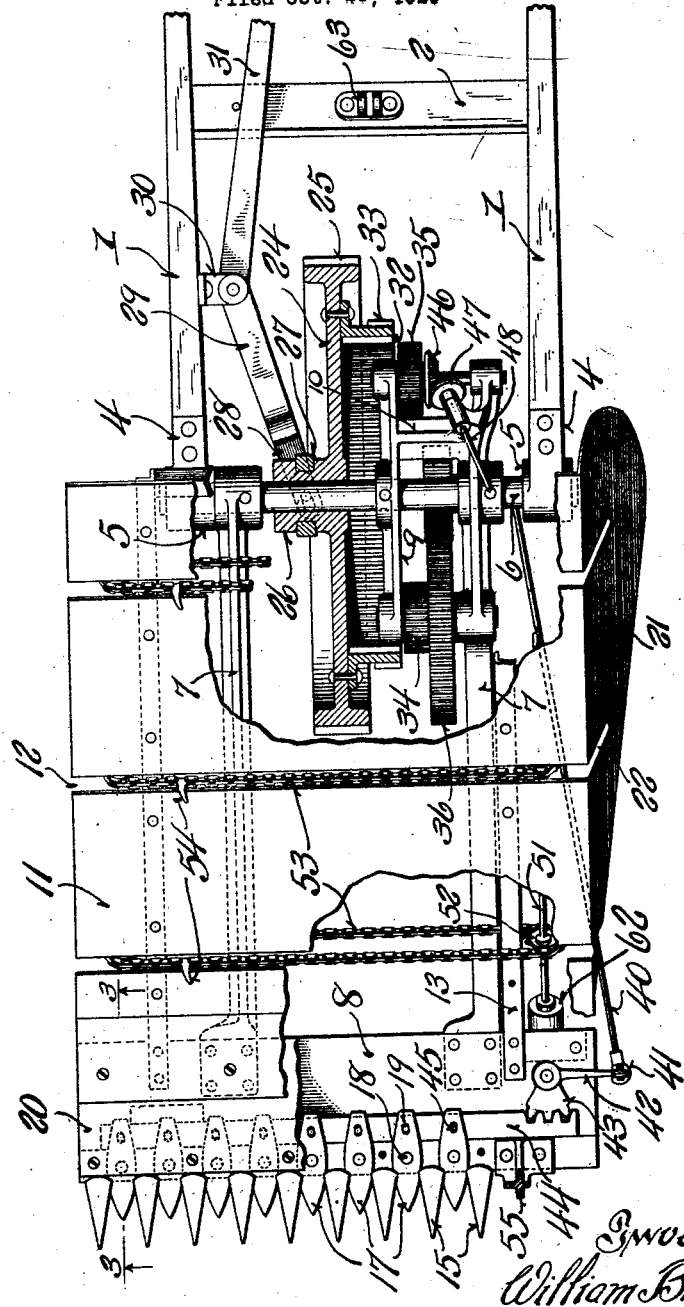

1,555,398

UNITED STATES PATENT OFFICE.

WILLIAM BRUNDERT, OF MILWAUKEE, WISCONSIN.

REAPER.

Application filed October 26, 1923. Serial No. 670,878.

*To all whom it may concern:*

Be it known that I, WILLIAM BRUNDERT, a citizen of the United States, and resident of Milwaukee, in the county of Milwaukee and State of Wisconsin, have invented certain new and useful Improvements in Reapers; and I do hereby declare that the following is a full, clear, and exact description thereof.

This invention relates to reapers.

In harvesting it frequently happens that there is not sufficient need for a large reaping machine to warrant the expense incident to the purchase and operation of such machine. However, there may be more work than can be conveniently manually accomplished by the ordinary methods, and it is the primary object of this invention to provide a reaper which may be operated by one man and which will fill the long felt need for a machine of this type suitable for materially increasing the output of one man while not subjecting the reaper to the relatively large expense of the usual type of reaping machine.

Objects of this invention are to provide a reaper which may be easily handled by one man, quickly transported or propelled to the desired point, readily placed in operative position when the field is reached, easily guided and driven across the field, and which, during the time of transit to and from the field, may be rendered inoperative so that the mechanism will not function while the machine is thus used.

Further objects are to provide a one man reaping machine which may be either propelled by the reaper or readily adapted for power driving, and which is so constructed that a minimum of effort is required to operate the machine, and which is of sturdy and simple construction such as may be readily produced at a small relative expense.

Further objects are to provide a reaping machine which will direct the wheat or other material towards the body of the machine, sever the wheat adjacent the ground while it is in a bowed or bent condition, catch the falling wheat and arrange it in an orderly manner with all of the stalks substantially parallel and which will discharge the wheat in a regular order from the side of the machine so that all of the wheat will lie in a regular row with the stalks pointing in the same direction.

An embodiment of the invention is shown in the accompanying drawings, in which:—

Figure 1 is a side view of the machine, such figure being partly in section and partly broken away to show the interior construction.

Figure 2 is a plan view of the machine with parts broken away.

Figure 3 is a sectional view on the line 3—3 of Figure 2.

The machine comprises a main frame consisting of side frame bars 1 which project rearwardly and form handles. These side frame bars may be joined by a transverse member 2 and provided with downwardly projecting feet 3 similar to those provided upon wheelbarrow side frames. The forward end of these side frame bars are provided with castings 4 rigidly secured thereto, and which are bored out to provide bearing hubs 5 within which a transverse shaft 6 is pivotally mounted. This transverse shaft has rigidly attached thereto a pair of forwardly projecting front frame members 7 which are rigidly attached adjacent their forward ends to a transverse member 8. One of the forward frame members is provided with a spaced arm 9 which is joined thereto by means of a connecting web 10, as shown in Figure 2. The forward frame portions 7 normally occupy the position shown in Figure 1, that is to say, they extend downwardly and forwardly. Above these members a plurality of spaced plates 11 are provided and, as will be seen from Figure 2, are separated to provide transverse channels or spaces 12 for a purpose hereinafter to appear. These transverse plates, which together constitute the main shield, are carried upon a light frame work 13 spaced upwardly from the frame members 7 and supported therefrom in any convenient manner as by means of the upwardly and forwardly extending brace pieces 14 (see Figure 1) which are secured at their upper ends to such frame members, and at their lower end to the body portion of the frame member 7. The forward part of the transverse member 8 is provided with a plurality of forwardly projecting tapered teeth 15, which, as may be seen from Figure 3, are slotted and are each provided with a shear blade or plate 16 rigidly carried thereby. A plurality of movable blades 17 are adapted to enter the slots in the teeth 15 and to cooperate with the shear blades 16, as shown in Figure 3. These movable blades 17 are each independently pivotally mounted, as indicated at 18, and are provided with rearward extensions equipped with elongated slots 19. These movable blades, as will be seen from Figure 2, are positioned between successive teeth 15, and the central and rear portion of such blades are covered by means of an extension 20 of the main shield formed of the portions 11. If desired, the main shield may have the portions 11 integrally formed with a laterally and downwardly extending deflector plate 21 provided with slots 22 aligning with the transverse slots or openings 12, as shown in Figures 1 and 2. The forward member 8 is preferably supported by castor wheels 23, as may be seen from Figure 1.

A single means is provided for both supporting and driving the mechanism of the reaper, and, as shown in Figures 1 and 2, consists of what may be termed a bull wheel 24, which is relatively large and is provided with a plurality of outwardly projecting cleats 25 adapted to insure a secure grip upon the ground.

This main wheel or driving wheel is provided with a hub 26 loosely mounted upon the shaft 6 and carries a collar 27. This collar is loosely mounted within a groove formed in the hub to permit rotation of the hub relatively to the collar. The collar 27, as may be seen from Figure 2, is pivotally joined to the forked arms 28 of a shift lever 29. This shift lever is pivotally carried in a bracket 30 attached to one of the handle bars 1 and is provided with a rearwardly projecting portion 31 adapted to be manipulated by the operator to move the main driving wheel 24 into operative or inoperative position. In the position shown in Figure 2, the main drive wheel is in its inoperative position.

The driving mechanism for transmitting motion from the main driving wheel to other portions of the apparatus comprises an internal annular gear 32 bolted to the main driving wheel 24 and provided with external teeth 33 which are adapted to be engaged by the driving pinion of a gasoline motor when such motor is attached to the machine. The internal annular gear is adapted to mesh with pinions 34 and 35 when the main wheel is shifted to the left by the handle 31. These pinions are carried between the member 9 and the corresponding side frame bar 7. The pinion 34 is rigidly attached to a larger gear 36, which in turn meshes with a pinion 37 rigidly attached to a short transverse shaft 38 (see Figure 1). This transverse shaft terminates in a crank arm 39 connected by a ball and socket joint with a forwardly and outwardly extending pitman or link 40. The forward end of this link is operatively connected by means of a ball and socket joint 41 with an arm 42 integrally formed with a segmental gear 43 such gear being pivotally carried upon the member 8, as shown in Figure 2. The segmental gear 43 meshes with the teeth of a short rack portion formed upon a transverse reciprocatory bar 44 (see Figure 2). The bar 44 is provided with a plurality of regularly spaced upwardly extending pins 45 which fit within the elongated slots 19 of the pivotally mounted cutter blades 17.

It will be seen, therefore, that as the reaper is propelled across the field rapid oscillatory motion is imparted to the blades 17, and these blades cooperating with the stationary shear blades 16 serve to sever the wheat adjacent the ground.

The pinion 35 has rigidly attached thereto a bevel gear 46 which meshes with a second bevel gear 47. This second bevel gear, as may be seen from Figure 1, is rigidly attached to an upwardly extending shaft 48. The upper end of this shaft carries a bevel gear 49 which meshes with a corresponding bevel gear 50 rigidly attached to a forwardly and downwardly extending shaft 51 carried in suitable brackets and supported adjacent the upper shield plate. The shaft 51 is provided with a plurality of sprocket wheels 52 mounted at the transverse slots 12 and carrying endless transverse chains 53,—the other ends of the chains being suitably supported upon corresponding sprocket wheels. These chains, it will be noted from Figures 1 and 2, are provided at spaced intervals with aligning prongs 54 which project upwardly through the slots 12. These prongs are carried at a uniform rate across the main shield 11 and gather the severed stalks and slide them over to the left hand side of the machine, such stalks being guided by the side shield 21 and dropped on the ground in a regular manner. In order to bow or bend the wheat over towards the main shield 11 as it is being severed, a light paddle wheel or similar device is provided adjacent the front of the machine and is carried by an upwardly extending arm or bracket 55 rigidly secured to the forward transverse member 8. This device comprises a plurality of radially extending arms 56 provided with transverse strips 57. It is rigidly secured to a sprocket wheel 58 which is driven by a sprocket wheel 59 through the medium of the chain 60. The sprocket wheel 59 is rigidly secured to a short shaft 61 which is mounted beneath the forward portion of the machine and is joined by bevel gears, a universal joint or any suitable mechanism of a similar nature to the shaft 51, as shown in Figure 1,—such bevel gears or similar device being housed in a suitable casing 62.

It will be seen from the description thus far given that when the machine is propelled across the ground that the feeder wheel bends the grain towards the shield 11 and the rapidly oscillating blades cut the stalks adjacent the ground thus allowing the wheat to fall in an orderly manner upon the shield. At the same time, the wheat is gathered by the projecting prongs 54 and carried sideways off the machine, such stalks being deposited in a parallel relation and in a regular manner upon the ground. When it is desired to transport the device or move it to a point where harvesting is to be effected, it is merely necessary to shift the clutch lever 31 thus positioning the main driving wheel 24, as shown in Figure 2, and severing the operative connection between said wheel and the mechanism of the reaper. Thereafter, the side frames 7 and all of the portions carried thereby are bodily rocked upwardly about the main shaft 6 until an apertured ear 62, carried by the rear upper portion of the shield frame members is positioned between the apertured ears 63 of a lug carried by the transverse member 2,—a suitable pin being slipped through the apertures to retain the parts in this position.

It will be seen that when the parts are in this position the operating mechanism of the reaper is idle and is elevated so that the machine may be readily propelled or rolled over the ground to the field,—the main wheel 24 merely acting as a support for the entire device.

It will be seen, therefore, that a reaper has been provided which may be easily operated by one man, which may be either manually propelled or power driven, which will regularly deposit the severed stalks upon the ground in an orderly manner, and which is of simple and substantial construction.

The term "body portion" will be employed in the claims hereinafter appearing to indicate the main frame work of the machine.

Although the invention has been described in considerable detail, it is to be understood that the invention may be variously embodied and is, therefore, to be limited only as claimed.

I claim:

1. A reaper comprising a body portion, a pair of handle bars pivotally joined thereto, a supporting wheel, transmission mechanism driven by said supporting wheel, a shield plate extending downwardly and forwardly to the forward portion of the machine and adapted to receive cut stalks thereon, a plurality of oscillatory blades mounted adjacent said forward edge, means driven from said transmission mechanism for oscillating said blades, and clutch mechanism for disconnecting said wheel from said transmission mechanism.

2. A reaper comprising a body portion having a downwardly and forwardly slanting shield plate provided with transverse slots therethrough, a transverse shaft carried by said body portion, a supporting and driving wheel loosely mounted upon said transverse shaft, a plurality of endless chains driven from said wheel and having projections extending upwardly through said slots, and a plurality of oscillatory blades mounted adjacent the front of said reaper and means for operative coupling said oscillatory blades with said driving wheel.

3. A reaper comprising a body portion having a downwardly and forwardly slanting shield plate provided with transverse slots therethrough, a transverse shaft carried by said body portion, a supporting and driving wheel loosely mounted upon said transverse shaft, a plurality of endless chains driven from said wheel and having projections extending upwardly through said slots, and a plurality of oscillatory blades mounted adjacent the front of said reaper and means for operative coupling said oscillatory blades with said driving wheel, and means for interrupting the operative connection between said driving wheel and said blades and chains.

4. A reaper comprising a body portion having a transverse shaft rigidly attached thereto, a supporting and driving wheel loosely mounted upon said shaft, gearing carried by said body portion, a gear carried by said wheel, means for sliding said wheel along said shaft for establishing operative connections between said gear and said gearing, a plurality of oscillatory blades mounted adjacent the forward lower end of said body portion, and means for operatively connecting said gearing and said oscillatory blades.

5. A reaper comprising a body portion having a transverse shaft, a supporting and driving wheel mounted upon said shaft, a shield plate carried by said body portion and extending forwardly and downwardly and having a plurality of transverse slots therethrough, a shaft paralleling said shield plate and mounted below such plate, means for operatively connecting said second mentioned shaft and drive wheel, a plurality of transverse endless chains driven from said second mentioned shaft and having projections extending upwardly through said slots, oscillatory blades mounted adjacent the front lower end of said reaper, and means driven from said wheel for oscillating said blades.

In testimony that I claim the foregoing I have hereunto set my hand at Milwaukee, in the county of Milwaukee and State of Wisconsin.

WILLIAM BRUNDERT.